United States Patent [19]

Bienert

[11] 4,142,759

[45] Mar. 6, 1979

[54] WIND DEFLECTOR FOR THE SLIDING TOP OF A MOTOR VEHICLE

[75] Inventor: Horst Bienert, Gauting, Fed. Rep. of Germany

[73] Assignee: Webasto-Werk W. Baier KG, Fed. Rep. of Germany

[21] Appl. No.: 718,818

[22] Filed: Aug. 30, 1976

[30] Foreign Application Priority Data

Sep. 9, 1975 [DE] Fed. Rep. of Germany ... 7528385[U]

[51] Int. Cl.² ............................................. B60J 7/22
[52] U.S. Cl. .................................. 296/137 J; 98/2.14
[58] Field of Search ............ 296/137 E, 137 F, 137 J; 98/2.14

[56] References Cited

U.S. PATENT DOCUMENTS

| 2,968,514 | 1/1961 | Golde | 296/137 F |
| 3,904,239 | 9/1975 | Jardin | 296/137 J |
| 3,922,032 | 11/1975 | Schaller | 296/137 J |
| 3,960,404 | 6/1976 | Bienert | 296/137 F |

FOREIGN PATENT DOCUMENTS

| 188231 | 2/1956 | Austria | 296/137 J |
| 79778 | 10/1954 | Netherlands | 296/137 J |
| 94727 | 3/1958 | Netherlands | 296/137 J |

*Primary Examiner*—Robert B. Reeves
*Assistant Examiner*—Michael J. Forman
*Attorney, Agent, or Firm*—Craig & Antonelli

[57] ABSTRACT

A wind deflector for the sliding top of a motor vehicle wherein pivoting of the deflector from a collapsed to an upward effective position is controlled in precisely-timed relation with and by sliding of the top from an closed to an open position, respectively, so that contact or interference between the two parts is avoided. The top may be adjusted after installation so that it is flush with the surrounding portion of the vehicle, without, however, varying the aforesaid timed relation.

3 Claims, 4 Drawing Figures

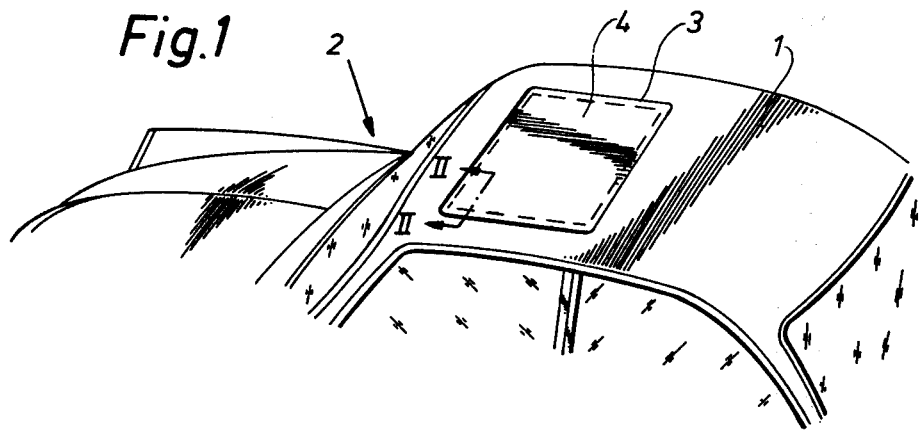
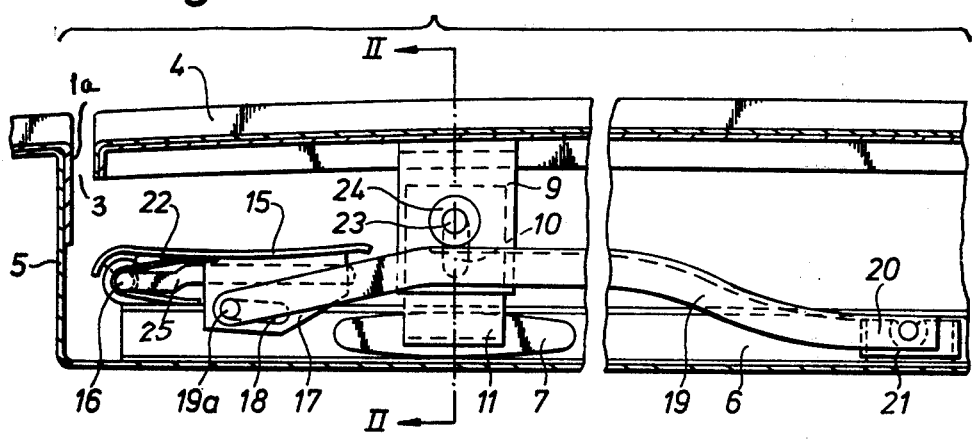
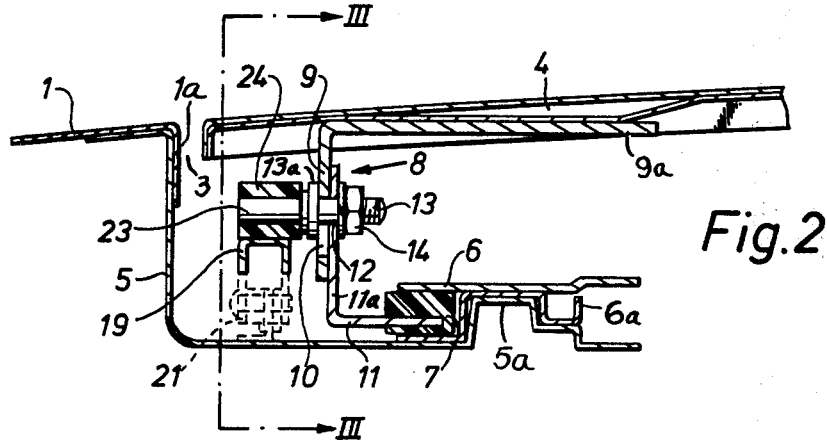

WIND DEFLECTOR FOR THE SLIDING TOP OF A MOTOR VEHICLE

SUMMARY OF THE INVENTION

The invention relates to an air or wind deflector for the sliding top or cover of a motor vehicle. The deflector is mounted for pivoting about a shaft disposed transversely of the longitudinal axis of the vehicle and is mechanically associated with the cover, through the intermediary of a pair of transversely-spaced, longitudinally-extending pivoted arms or levers, so that when the cover is moved from a closed to an open position, pivoting of the deflector in timed relation with such movement is effected. Thus the deflector is pivoted from a first or collapsed position beneath and out of contact with the cover, by spring action to a second or erect position wherein it deflects the oncoming air flow upwardly and keeps it away from the exposed opening in the vehicle's top.

While wind deflectors of the type mentioned in the preceding paragraph are known, they possess the drawback and disadvantage that pivoting of the deflector from its erect or operating position to its collapsed position, must be effected so early in a cycle of operation that sliding of the cover to the closed position is not impeded by engagement of the front edge with the deflector. Since adaption of the sliding cover to the surrounding area of the top may require a vertical adjustment of the closed cover in order to position its outer surface clush with the surrounding surface of the top, such adjustment may result in contact between the deflector and cover before the latter is fully closed. When such interference occurs it is necessary for one person to press down on the deflector from outside the vehicle while another inside the vehicle operates the cover to full closure. This is an awkward, time-consuming and often dangerous procedure.

According it is an object of the invention to provide a wind deflector of the type discussed, in which contact or collision between the deflector and sliding cover is prevented and avoided as the latter moves from its open to its closed position, and this despite any necessary vertical adjustment of the cover to effect flush relation with the surrounding surface of the top.

According to the invention a top frame is fixedly mounted within the ventilator opening of the vehicle's top. This frame mounts a pair of laterally-spaced, longitudinally-extending, parallel channel-like tracks each of which has a shoe guided therein. The structural element that is connected with the deflector plate and pivots the same to collapsed position is associated with the aforesaid shoes in such a way that it remains unafected by adjustments in height of the cover, so that while the deflector is pivoted in fixed timed relation with sliding of the cover, collision or interference between the two parts is impossible.

It is a further object of the invention to provide a structure embodying the advance and advantages as set forth in the preceding paragraph, wherein the structural element that pivots the deflector to collapsed position is preferably a roller mounted on the support portion so at to pivot about a shaft disposed parallel to the pivot shaft of the deflector. In an embodiment wherein the two support portions are connected by a screw which extends through an essentially vertical slot in the support portion fastened to the cover and through a hole in the support portion fastened to the guide or shoe, the roller may be pivoted upon an axial extension of the screw. The roller preferably is of plastic material in order to effect noiseless operation of the wind deflector and also to avoid corrosion of the levers contacted thereby.

Further details and characteristics of the invention will become clear from a study of the following description in connection with the accompanying drawing wherein an embodiment of the invention is depicted.

BRIEF DESCRIPTION OF THE DRAWING

FIG. 1 is a perspective view showing the top portion of a motor vehicle equipped with a sliding cover embodying the invention, the cover being shown in fully closed position;

FIG. 2 is a detail sectional view to a scale enlarged over FIG. 1, taken in an essentially vertical plane as indicated by line II—II, FIG. 1, the cover being closed;

FIG. 3 is a detail sectional view to about the same scale as FIG. 2, taken in a vertical plane normal to the plane of FIG. 2, as indicated by line III—III, FIG. 2.

DESCRIPTION OF THE PREFERRED EMBODIMENT

Figure 4:
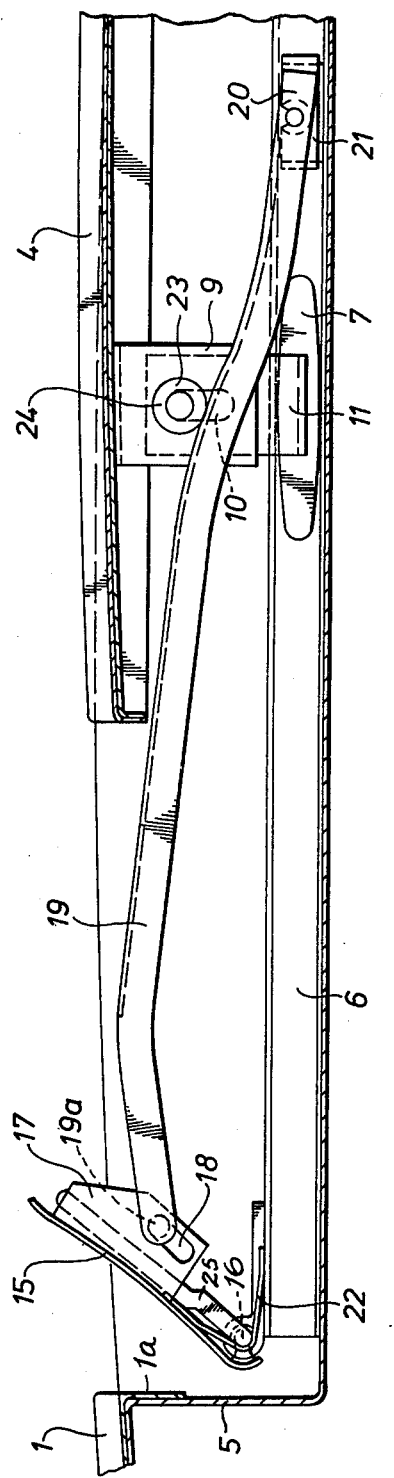
FIG. 4 is a sectional view to about the same scale as FIGS. 2 and 3, taken in the same plane as FIG. 3 but showing the position of the parts when the cover has been retracted to open position and the wind deflector has erected to operating position.

Referring to FIG. 1, a motor vehicle 2 is shown in partial outline as having a top 1 provided with a generally rectangular ventilator opening 3. The opening can be obturated or exposed as desired, by means of slidng cover 4. For this purpose the material of the top is shown as being downwardly flanged as at 1a, FIGS. 2, 3 and 4, to form a skirt defining the border or periphery of opening 3.

A top frame 5 is attached to the aforesaid flange and depends therefrom along its front and side or lateral portions, it being understood that the front portion extends transversely of the vehicle and its side portions are disposed longitudinally of the vehicle. Referring in particular to FIG. 2 it is noted that frame 5 is shaped to extend downwardly, then inwardly and horizontally to terminate in a channel-like reinforcement 5a which extends in the fore-and-aft or longitudinal direction of the vehicle. An intermediate longitudinally-extending shaped part such as 6a, fits over channel 5a and together with an upper elongated plate-like element 6, is secured to frame 5 and as clearly depicted upon FIG. 2, forms with channeled portion 5a a fore and aft generally horizontal outwardly-facing straight guideway. The construction just described is duplicated at the other or right side of opening 3 so that there are thus formed parallel guideways mounting cover 4 for longitudinal sliding on and with respect to top 1, whereby it may be translated or slid from a first position as in FIG. 1, obturating opening 3, to a second position as in FIG. 4 wherein the opening is unobstructed.

Cover 4 is supported for the aforesaid longitudinal movement or sliding, by means including a two-part bracket or support 8 located as shown upon FIG. 3, adjacent the front edge thereof. Thus, a first part of the bracket comprises a strap or part 9 bent at right angle between its ends to form a first element 9a secured to and fixed with the under side of cover 4, and a depending element 9 which as shown at FIGS. 2, 3 and 4, has therein a vertical adjustment slot 10.

The second part of the bracket of about the same width as part 9, 9a, comprises an upstanding portion 11a having a bore 12 therethrough, and a horizontal, inwardly-extending arm portion 11 to which a sliding shoe 7 of low-friction plastic, is attached. From FIG. 2 it is noted that the shoe has a smooth sliding fit in the guideway formed conjointly by parts 5a, 6a and 6, as previously described. Since bracket 8 and associated parts as just described, are duplicated at the other side edge of cover 4 the latter is mounted for positively-guided sliding between the fully closed position of FIGS. 1, 2 and 3, and the open position exposing opening 3 to passage of air, as in FIG. 4.

The two parts of each bracket 8 are releasably connected by means of a screw 13 shown as headed at 13a, FIG. 2, and passing with a smooth fit through slot 10 in element 9 and bore 12 in portion 11a. A nut 14 threaded on the screw acts when tightened to fix together the two parts of the bracket. Since bore 12 is in the part attached to shoe 7, it is clear that by loosening nut 14, cover 4 may be vertically adjusted so that in the closed position it is flush with the surrounding area of top 1, without however, affecting the vertical position of the screw with respect to the top.

An air deflector plate is identified at 15, FIGS. 3 and 4 and may be shaped in the fore-and-aft vertical plane, as shown upon FIG. 3. At its forward edge the deflector has depending laterally-spaced tabs pierced to mount a shaft 16 disposed transversely of the vehicle and connected for pivotal motion to frame 5 adjacent the front edge of opening 3. Rearwardly, plate 15 has laterally-spaced depending ears 17 integrally connected therewith. Each ear is slotted as shown at 18, FIGS. 3 and 4, each slot extending generally in the fore-and-aft direction when the plate is in closed or collapsed position.

Each of a pair of elongated lever arms one of which is indicated at 19, FIGS. 2, 3 and 4, has its rearward end 20 pivoted to frame 5 by means of a respective one, right and left, of a pair of bearing blocks 21. Thus the rearward ends of arms 19 may pivot about a common axis disposed transversely of the vehicle. As shown at FIG. 2, the arms are of inverted channel shape in transverse section.

At their forward ends the arms are provided with bearing studs or pins 19a fixed thereto and each of which slidingly projects with a smooth fit into a respective one of slots 18. One or more springs 22 encircle shaft 16 and have radially-projecting ends engaging respectively the top of a respective plate 6 and the under side of deflector 15, which is thus continuously urged into counterclockwise pivoting as viewed upon FIGS. 3 and 4, about the axis of shaft 16. The pivoting force of the springs is also applied to the contiguous ends of arms 19 to urge them into clockwise rotation as seen at FIGS. 3 and 4. Part 25 is the end of shaft 16 bent 90° and extending into plastic ear 17 which is held in place by said end.

Clockwise pivoting of the equal, parallel and laterally-spaced arms 19 is resisted by mechanism best shown upon FIG. 2 as including a shaft-like extension or prolongation 23 of screw 13 on which a plastic roller 24 is journaled and which is in contact with the generally flat upper surface of its respective arm in the closed position and during the last part of the closing motion of the cover 4. The arms may be conveniently shaped in the longitudinal vertical plane, as best shown at FIG. 4. Begginning at the rearward end 20, each arm slopes upwardly in a smooth curve, followed by a generally straight run and ending in a downwardly-curving forward portion to which stud 19a is attached. FIG. 3 shows that in the position wherein cover 4 is fully closed, roller 24 engages the straight run of its arm, at or near the forward terminus and thus through stud 19a acts to hold deflector plate 15 in closed or collapsed position against the urge of springs 22. However, when cover 4 is slid toward its open position exposing opening 3, rollers 24 move rearwardly along their respective arms, thus allowing the springs to pivot deflector 15 counterclockwise from the collapsed position of FIG. 3 to the operating position of FIG. 4 wherein the air flow generated by the movement of the vehicle is deflected and prevented from passing through the opening 3 into the interior of the vehicle.

By loosening the two nuts 14, one on each screw 13 it is possible to adjust the level of cover 4 so that in its closed position it is precisely flush with the surrounding surface of top 1. Further, since the slot 10 enabling this adjustment, is in element 9 fixed with the top, such adjustments are in element 9 and can be made without affecting the timing of pivoting of deflector 15 effected by sliding of the cover. In other words, due to the fact that roller 24 whose position is responsible for the exact time of pivoting of wind deflector 15, is mounted on the extension 23 of screw 13, and this screw is positioned at a fixed level with respect to shoe 7, the exact moment of pivoting of deflector plate 15 is completely independent of the adjustment in height of cover 4. It is therefore possible that the deflector is in all cases pivoted to its collapsed position on time so that it cannot come in contact with the front endge of cover 4 as the latter moves into its fully closed position. This result is attained independently of whether cover 4 is adjusted at a somewhat higher or lower level relatively to shoe 7.

Thus, when the cover is slid from open to closed position, deflector 15 is thereby automatically pivoted downwardly in timed relation to clear the path of the cover.

As previously stated, in the prior art the front edge of the cover could contact the partially-erect deflector, thus preventing further sliding of the cover toward and into its closed position. This made it necessary to manually pivot the deflector plate out of the path of the cover so that the latter could be slid into fully closed position. While it is not absolutely essential that roller 24 be journaled on a bearing coaxial of and integral with screw 13, the construction shown is preferred as being relatively simple, efficient in operation and inexpensive because it avoids the necessity for added parts and complications otherwise required. The shape of arms 19 in the plane of FIGS. 3 and 4 can be varied to some extent in manufacture, as by varying the radii of curvature of the arcuate portions thereof. Comparison of FIGS. 3 and 4 shows that studs 19a ride in and along their respective slots as the deflector pivots between its limiting positions of open and fully collapsed.

Various modifications, substitutions of equivalents and changes in shape and relative disposition of the parts will be obvious to those skilled in the art, after a study of the foregoing disclosure.

I claim:

1. In a cover assembly for the opening in the top of a motor vehicle, an open frame shaped to fit said top opening, adapted for securement in fixed relation with the top, and having a central longitudinal fore-and-aft first axis, a cover shaped to conform to and fit said frame, guide means fixed with said frame in parallel relation with said first axis, bracket means fixed with said cover and including a slide engaging and positively guided by said guide means, to guide said cover for movement from a first position obturating the opening in said frame, to a second position clearing said opening, a deflector plate, first means mounting said plate to said frame within the opening therein, for pivoting about a second axis normal to said first axis, from a first position collapsed within said frame, to a second position erected with respect to said frame, second means responsive to movement of said cover along said first axis, between its said first and second positions and effecting pivoting of said plate between its said first and second positions, respectively, and in timed relation with movement of said cover, said bracket means comprising two elements adjustable with respect to each other for variable length, with one element connected to said cover and the other element connected to said slide, said second means comprising an actuating member connected to said other element, and spring means engaging said plate and urging the same in pivotal movement about said second axis, from its said first to its said second position, said second means further comprising an elongated lever disposed generally parallel with said first axis and pivoted at its rearward end to said frame, said plate including a slotted ear depending therefrom, a stud fixed with the forward end of said lever and slidably and pivotally engaging the slot in said ear, and roller means journaled to said bracket means and rollable along said lever in controlling contact therewith as said cover moves between its said first and second positions, and each said element of the bracket means including a vertically-disposed arm, said arms overlapping, there being an essentially vertical slot in the arm of said first element, and a bore in the arm of said second element, a screw passing through said slot and bore, a nut on said screw operable to releasably secure said arms together fixedly and in a selected one of a plurality of adjusted relations parallel with the slot in said first element, and a journal bearing for said roller means integral with said screw and extending axially thereof.

2. The assembly of claim 1, said second element having a laterally-directed arm, said guide means comprising a channel U-shaped in transverse section and open along one side and parallel with said first axis, said slide fitting said channel and being attached to the end of said laterally-directed arm.

3. The combination with the top of an automotive vehicle and having an opening therethrough, of a frame fixed with and secured to the periphery of said opening in depending relation therewith, a cover shaped to smoothly fit said frame, guide means fixed with said frame, parallel with the fore-and-aft axis of the vehicle, a slide engaging and positively guided by said guide means to guide movement of said cover in parallel with said axis, from a first position obturating said vehicle top opening, to a second position clearing the same, a first bracket part secured to said cover and including a first arm depending therefrom, a second bracket part secured to said slide and including a second arm extending upwardly therefrom, said arms overlapping, screw means passing through a slot in said first arm and a bore in said second arm, to releasably secure said arms together in a selected one of a plurality of positions of relative vertical adjustment, an elongated lever pivoted at its rearward end to said frame and extending forwardly generally parallel with said axis, a stud fixed to the forward end of said lever, a deflector plate mounted to said frame on a second axis normal to said first axis, and pivotable from a first collapsed position within said frame, to a second erect position extending from said frame, a slotted ear depending from said plate and slidably and pivotally receiving said stud, roller means journaled on said screw means coaxially therewith and contacting said lever to control pivoting thereof and effect pivoting of said plate between its said first and second positions, respectively, and spring means urging said plate into pivotal movement toward its said second position, and said lever into contact with said roller means.

* * * * *